US005175730A

United States Patent [19]

Murai

[11] Patent Number: 5,175,730

[45] Date of Patent: Dec. 29, 1992

[54] COMMUNICATION CONTROL UNIT

[75] Inventor: Toshiharu Murai, Kawasaki, Japan

[73] Assignee: Ricoh Company, Ltd., Tokyo, Japan

[21] Appl. No.: 433,338

[22] Filed: Nov. 8, 1989

[30] Foreign Application Priority Data

Nov. 10, 1988 [JP] Japan ............................ 63-282365

[51] Int. Cl.[5] ............................................ H04J 3/24

[52] U.S. Cl. .................................... 370/85.2; 370/60; 340/825.07

[58] Field of Search ....................... 370/85.3, 85.2, 13, 370/24, 60, 94.1; 371/32, 33, 16.1; 340/825.5, 825.07

[56] References Cited

U.S. PATENT DOCUMENTS

| | | | |
|---|---|---|---|
| 4,063,220 | 12/1977 | Metcalfe et al. | 370/85.2 |
| 4,803,681 | 2/1989 | Takahashi | 370/85.2 |
| 4,839,887 | 6/1989 | Yano | 370/60 |
| 4,903,016 | 2/1990 | Murai et al. | 370/18 |

*Primary Examiner*—Curtis Kuntz
*Assistant Examiner*—T. Ghebretinsae
*Attorney, Agent, or Firm*—Oblon, Spivak, McClelland, Maier & Neustadt

[57] ABSTRACT

A communication control unit controls data transmission and reception between a terminal and a communication network which includes a full duplex communication path, and a communication is made by transmitting a sending signal which includes a destination address of a destination terminal and transmitting a returning signal when the destination address is confirmed. The communication control unit comprises a first part for timing a first time from a start of a transmission, timing a second time when the first time elapses and stopping the transmission when the returning signal is received within the first time and also when no returning signal is received even after the second time elapses, a second part for detecting the sending signal, comparing an address which is included within the detected sending signal and home address of a terminal to which the communication control unit is connected and transmitting the returning signal when the two compared addresses coincide, and a third part for limiting a start of the first control part and the acknowledge signal transmitting part until a state in which no signal exists in the communication path continues for a third time.

11 Claims, 12 Drawing Sheets

COMMUNICATION NETWORK
900
TRANS/REC
ENCOD/DECOD
1
TXC TRMT
RTS TRMT
TXD
RXC RCV
CRS RCV
RXD
20
TIMER PART
C
DELAY
10
B
TIMER
RESET
9
A
12
11
13
30
ENABLE
START
PREAMBLE DETECT
3
I
ADR COMP
4
ROM
5
J
ACK SIGNAL GENE
6
ACK SIGNAL TRANSMIT PART
ENABLE
SEQ CONTL
7
F
E
COLLISION DETECT
8
G
START
D
H
K
L
M
14
2
TXC
RTS
TXD
RXC
CRS
RXD
CDT
CONTL

SAI
SA
ENABLE
TIMER PART
36
RESET
90
35
START
RESET
SE Q CONTL
70
SB
SC
80
CD
R
COLLISION DETECT
G
37
34
33
32
31
2
E
TXC
RTS
TXD
RXC
CRS
RXD
CDT
CONTL
K
L
J
I
O
41
ACK SIGNAL GENE
ADR COMP
PREAMBLE DETECT
46
44
43
ROM
45
47
LATCH
F
RESET
40 ACK SIGNAL TRANSMIT PART
1
TRMT
RCV
ENCOD/DECOD
900
TRANS/REC
COMMUNICATION NETWORK

600
TO CLR OF CCT 100
201
BROADCAST SIGNAL DETECT
105
106
CLR
Q
IN
CK
RTS
PREAMBLE DETECT
TXD
TXC
FROM Q1 OF CCT 103
FROM GATE 200

700
Vcc
203
H
FROM Q OF CCT 106
FROM Q̄ OF CCT 104

COMMUNICATION CONTROL UNIT

BACKGROUND OF THE INVENTION

The present invention generally relates to communication control units, and more particularly to a communication control unit which makes a communication in a communication network which has full duplex communication paths and wherein a source terminal sends a sending signal including a destination address and the communication control unit receives an answering signal from a destination terminal.

Presently, communication network systems employing optical fiber cables are being put into practical use because the optical fiber cables are less affected by noise caused by external electromagnetic waves when compared with coaxial cables. Such communication networks have full duplex communication paths. When making a communication in the full duplex transmission system using a carrier sense multiple access with collision detection (CSMA/CD) system communication protocol which is typified by an Ethernet (registered trademark), a star shaped local area network (LAN) and the like, the conventional collision detection system for the half duplex communication path cannot be applied for the detection of success or failure of the communication. In this case, another system must be used for the detection of success or failure of the communication.

A communication network system called ANARCHY is proposed in Neff et al., "A Local Network Design Using Fiber Optics", IEEE Comput. Soc. Int. Conf. 22nd, COMPCON Spring 1981. According to this proposed system, nodes constitute a communication network and the node detects a destination address within a sending signal which is transmitted from a source terminal to a transmission path. The node returns an acknowledge signal when the detected destination address coincides with an address of a terminal which is connected to the node. In other words, on the transmission side which sends the sending signal, it is discriminated that a collision occurred when the acknowledge signal is not received within a predetermined time from a time when the sending of the sending signal starts.

However, according to this proposed system, the degree of freedom with which the structure of the communication network may be designed is extremely limited because the node detects the destination address. For example, the address detection function of the node must be modified when the terminal is moved, changed or added. Accordingly, this proposed system suffers a drawback in that the modification of the terminal affects the entire communication network. In addition, the acknowledge signal is returned in response to the sending signal even after a communication path is fixed, thereby limiting the capability of the communication paths to the half duplex communication even though the communication paths are full duplex communication paths.

Generally, the communication control unit in the switching network generates a guard time for limiting the transmission of the signal for a predetermined time when the communication ends. The node which sets the communication path detects the end of the communication and releases the communication path when the signal transmission and reception in the communication path is stopped for over a predetermined time. After the communication ends, the terminal must generate the guard time and stop the transmission to the node. However, in the communication network disclosed in a U.S. Pat. No. 4,839,887, the sending signal (communication request signal) before the setting of the communication path is broadcast from the node, and not by a routing as in the case of the public communication network. The signals broadcast from the node is received by all communication control units, and only the communication control unit at the destination returns the answering signal. The communication control unit receives the sending signal which is not intended therefor every time a call out is made, and there is a problem in that the efficiency of the communication network becomes poor when the guard time is generated every time the sending signal is received.

In a discrete communication, the returning signal is returned in response to the sending signal (communication request signal). But in the case of broadcast communication, the destination address which is included in the sending signal is a broadcast address and does not designate one terminal. Hence, no answering signal is returned in response to the sending signal. For this reason, there is a problem in that the call out becomes unsuccessful when the sending signal and the returning signal are processed with the transmission procedure of the discrete communication.

SUMMARY OF THE INVENTION

Accordingly, it is a general object of the present invention to provide a novel and useful communication control unit in which the problems described above are eliminated.

Another and more specific object of the present invention is to provide a communication control unit for controlling data transmission and reception between a terminal and a communication network which includes a full duplex communication path, where a communication is made by transmitting a sending signal which includes a destination address of a destination terminal and transmitting a returning signal when the destination address is confirmed. The communication control unit comprises first control means including means for timing a first predetermined time from a start of a transmission, means for timing a second predetermined time when the first predetermined time elapses, and means for stopping the transmission when the returning signal is received within the first predetermined time and also when no returning signal is received even after the second predetermined time elapses, acknowledge signal transmitting means including means for detecting the sending signal, means for comparing an address which is included within the detected sending signal and home address of a terminal to which the communication control unit is connected, and means for transmitting the returning signal when the two compared addresses coincide, and timer means for limiting a start of the first control means and the acknowledge signal transmitting means until a state in which no signal exists in the communication path continues for a third predetermined time. According to the communication control unit of the present invention, the efficiency of a retransmission is improved because it is possible to quickly detect whether a transmission is successful or unsuccessful. In the case of a reception, the concept of address is independent of the network since an acknowledge signal is returned by confirming a destination address, and it is possible to design the network structure with a large degree of freedom. In addition, in a communication network in which a communication path between source and destination terminals can be fixed after returning an acknowledge signal in response to a first transmission message, it is possible to make a full duplex communication. In this case, it is possible to apply the present invention to terminals for use in video phones, video conference systems and the like. When a communication is unsuccessful, a stand-by state is maintained for a next retrial or another communication from a different terminal, thereby enabling an efficient use of the communication network. The stand-by state has no restrictions as for the time sequence of the terminal such as when making the retrial, and the present invention is applicable to various applications in this respect. The present invention enables a communication of a broadcast signal. This means that the communication control unit according to the present invention may be used in various applications of existing communication systems.

Other objects and further features of the present invention will be apparent from the following detailed description when read in conjunction with the accompanying drawings.

BRIEF DESCRIPTION OF THE DRAWINGS

FIGS. 13(A) through 13(0) are timing charts for explaining an operation of the second embodiment when a collision occurs;

DESCRIPTION OF THE PREFERRED EMBODIMENTS

Figure 1:
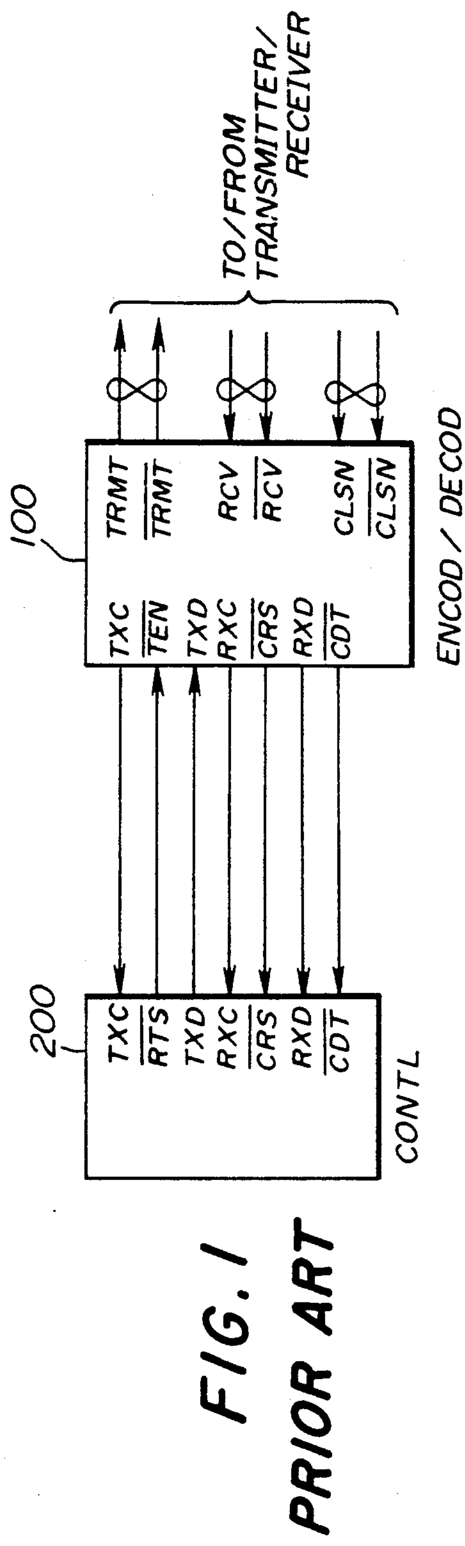
FIG. 1 is a system block diagram showing an example of an interface part of a conventional Ethernet network.
Figure 2:
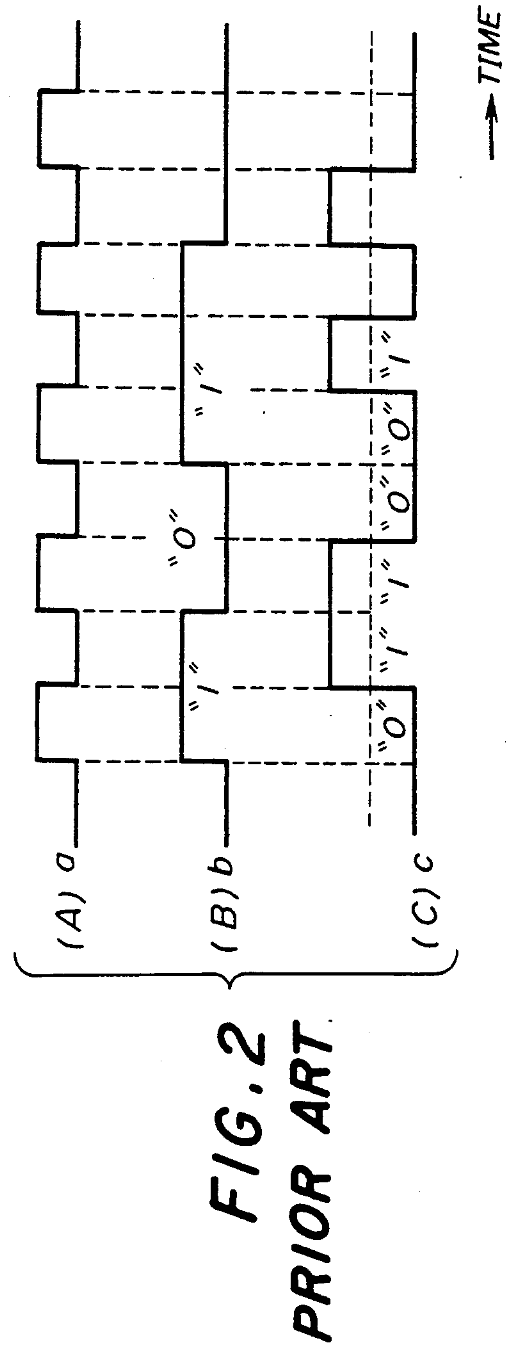
FIGS. 2(A) through 2(C) are timing charts for explaining the Manchester code and an operation of the interface part shown in FIG. 1.

Before explaining the communication control unit according to the present invention, a brief description will be given of an interface part of a conventional Ethernet network by referring to FIG. 1, so as to facilitate the understanding of the present invention. In FIG. 1, a Manchester encoder/decoder 100 converts "1" and "0" of a D.C. signal b shown in FIG. 2(B) into "01" and "10" of a polar signal c (Manchester code) shown in FIG. 2(C) in response to a clock signal a which is shown in FIG. 2(A). In addition, the encoder/decoder 100 reproduces the clock signal a from the polar signal c and converts the polar signal c into the D.C. signal b. The encoder/decoder 100 is coupled to the Ethernet network via a transmitter/receiver (not shown), and an interface (not shown) between the encoder/decoder 100 and the transmitter/receiver uses the Manchester code.

When reception messages RCV and $\overline{RCV}$ in the Manchester code are supplied to the encoder/decoder 100 at the time of a reception, the encoder/decoder 100 outputs a reception detection signal $\overline{CRS}$ ("0") and a reception message RXD which is a D.C. signal. The encoder/decoder 100 further outputs a clock signal RXC which is reproduced from the Manchester code.

At the time of a transmission, a controller 200 inputs a clock signal TXC from the encoder/decoder 100 and outputs in synchronism with this clock signal TXC a transmission request signal $\overline{RTS}$ ("0") and a transmission message TXD which is a D.C. signal. The encoder/decoder 100 receives these signals $\overline{RTS}$ and TXD and converts the message into Manchester codes TRMT and $\overline{TRMT}$ by use of the clock signal TXC. The Manchester codes TRMT and $\overline{TRMT}$ are supplied to the transmitter/receiver.

The communication path of the Ethernet network has the form of a half duplex bus, and a collision occurs when transmissions are simultaneously made from two or more terminals. A data frame is destroyed when the collision occurs. The transmitter/receiver outputs collision display signals CLSN and $\overline{CLSN}$ to the encoder/decoder 100 when the collision is detected. The encoder/decoder 100 supplies a collision detection signal $\overline{CDT}$ ("0") to the controller 200 when the collision display signals CLSN and $\overline{CLSN}$ are received from the transmitter/receiver. The controller 200 stops the transmission in response to the collision detection signal $\overline{CDT}$.

Next, a description will be given of a first embodiment of the communication control unit according to the present invention, by referring to FIG. 3. In this embodiment, the present invention is applied to a terminal of an Ethernet network.

Figure 3:
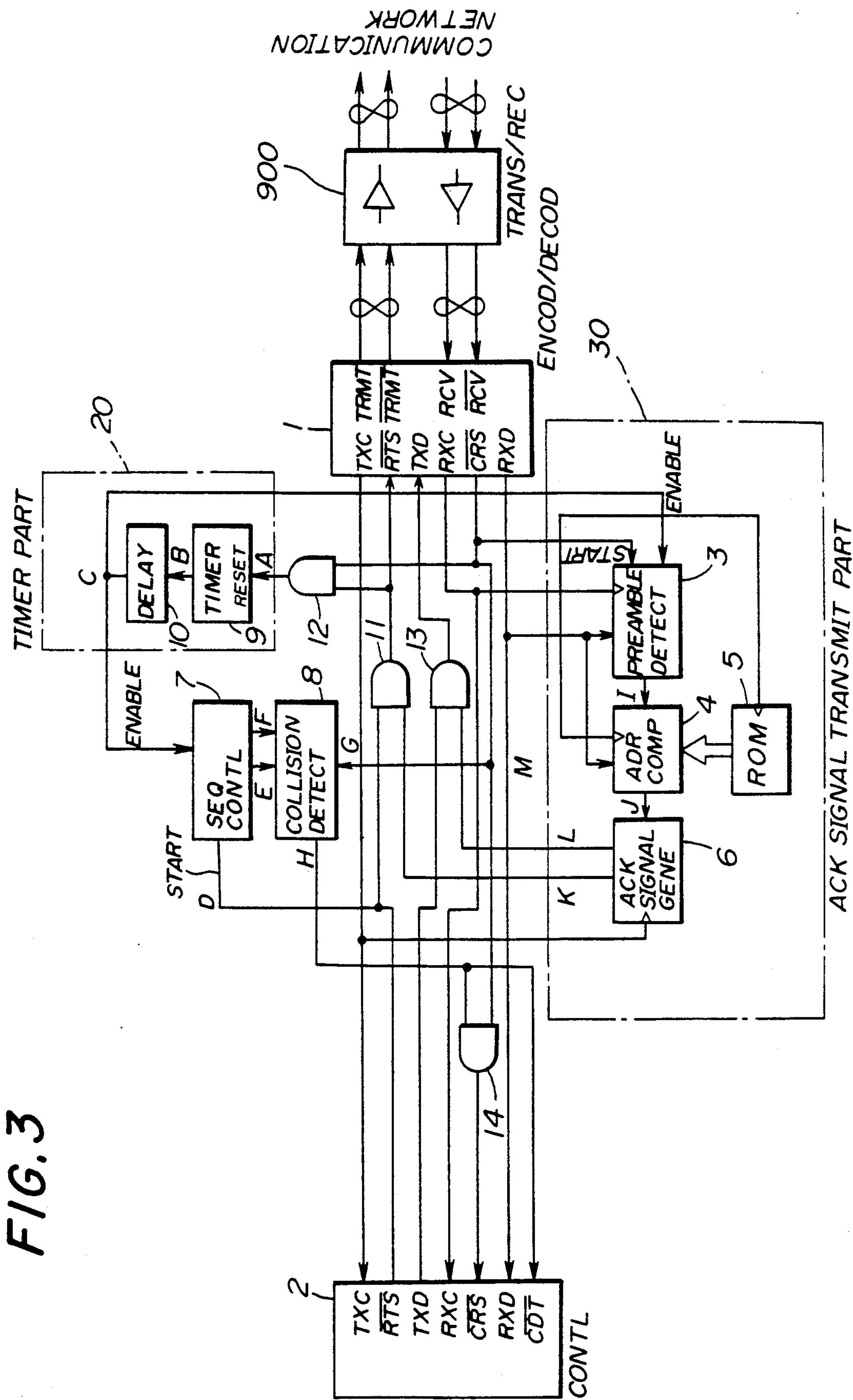
FIG. 3 is a system block diagram showing a first embodiment of a communication control unit according to the present invention together with a part of a terminal.

In FIG. 3, when reception messages RCV and $\overline{RCV}$ are supplied to a Manchester encoder/decoder 1, the encoder/decoder 1 outputs a reception detection signal $\overline{CRS}$ ("0"). This reception detection signal $\overline{CRS}$ is supplied to a timer 9 and a controller 2 via AND gate circuits 14 and 12, an acknowledge signal transmitting part 30, and a collision detection part 8. The encoder/decoder 1 also outputs a reception message RXD (M) which is supplied to a preamble detection part 3, an address comparator part 4 and the controller 2. In addition, the encoder/decoder 1 reproduces a clock signal RXC from the reception message RXD and supplies the clock signal RXC to the preamble detection part 3, the address comparator part 4 and the controller 2.

The encoder/decoder 1 and the controller 2 are parts of a terminal to which the communication control unit is connected.

In the case of a transmission, the controller 2 outputs a transmission request signal $\overline{RTS}$ ("0") which is supplied to the encoder/decoder 1 via the AND gate circuit 11 and a sequence controller 7. A clock signal TXC which is output from the encoder/decoder 1 is supplied to the controller 2 and an acknowledge signal generator 6. The controller 2 supplies a transmission message TXD which is in synchronism with the clock signal TXC to the encoder/decoder 1 via an AND gate circuit 13.

The encoder/decoder 1 converts the transmission message TXD into Manchester codes TRMT and $\overline{TRMT}$ which are supplied to a transmitter/receiver 900. The transmitter/receiver 900 is coupled to a communication network (not shown). During the transmission, the controller 2 outputs the transmission message TXD and the transmission request signal $\overline{RTS}$ which are inactive when the controller 2 receives a collision signal H from the collision detection part 8 via the AND gate circuit 14 as a reception detection signal $\overline{CRS}$ and a collision signal $\overline{CDT}$.

Figure 4:
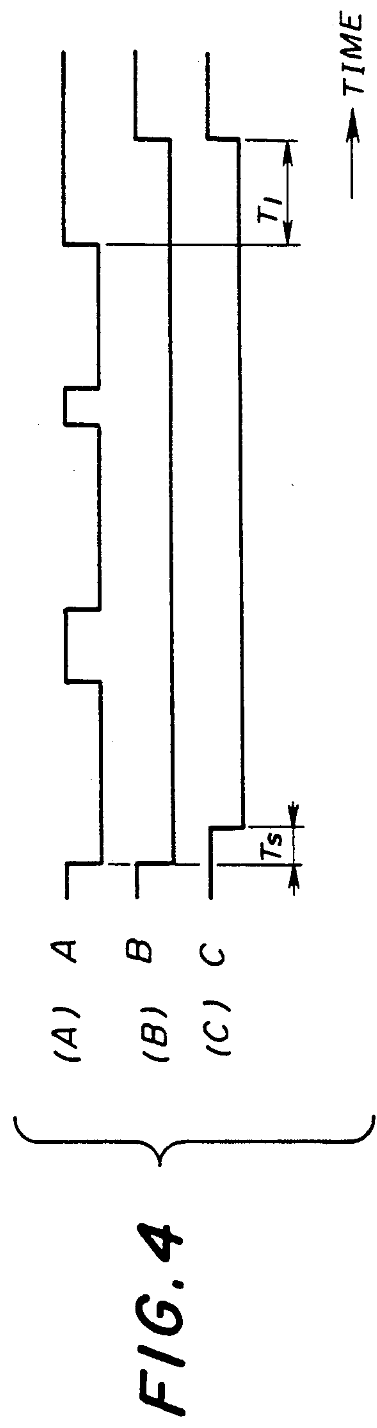
FIGS. 4(A) through 4(C) are timing charts for explaining an operation of a timer part shown in FIG. 3.

Next, a description will be given of an operation of a timer part 20 shown in FIG. 3, by referring to timing charts of FIGS. 4(A) through 4(C). The timer part 20 supplies an enable signal C shown in FIG. 4(C) to the acknowledge signal transmitting part 30 and the sequence controller 7 when the inactive transmission request signal $\overline{RTS}$ from the controller 2 and the inactive reception detection signal $\overline{CRS}$ from the encoder/decoder 1 are received via the AND gate circuit 12. An output signal A of the AND gate circuit 12 is shown in FIG. 4(A), and an output signal B of the timer 9 is shown in FIG. 4(B). The inactive transmission request signal $\overline{RTS}$ and the inactive reception detection signal $\overline{CRS}$ have a value "1".

The timer 9 is reset when the output signal A of the AND gate circuit 12 inverts to "0" by the start of the transmission or reception. The output signal B of the timer 9 is supplied to a delay circuit 10, and the delay circuit 10 inverts the output enable signal C to "0" after a time TS. The timer 9 is set when the transmission and reception end and this state continues for a time T1, and thus, the delay circuit 10 outputs the enable signal C which is "1". The delay time T1 in the timer 9 is set to a time it takes for the terminals and the nodes of the communication network to completely stop or become inactive.

When the reception starts, the reception detection signal $\overline{CRS}$, the reception message RXD and the clock signal RXC from the encoder/decoder 1 are supplied to the preamble detection part 3, the address comparator part 4 and a read only memory (ROM) 5 of the acknowledge signal transmitting part 30. The preamble detection part 3 outputs a signal I which starts the address comparator part 4 when the end of the preamble of the reception message RXD is detected. The address comparator part 4 receives a destination address within the reception message RXD and a home address stored in the ROM 5, and outputs a signal J to the acknowledge signal generator 6 when the two addresses coincide. The home address is the address of the terminal to which the communication control unit is connected. The acknowledge signal generator 6 supplies a transmission request signal K to the AND gate circuit 11 and an acknowledge signal L to the AND gate circuit 13 when the signal J is activated. The encoder/decoder 1 receives the output signals of the AND gate circuits 11 and 13 as a transmission request signal $\overline{RTS}$ and a transmission message TXD and outputs Manchester code acknowledge signals TRMT and $\overline{TRMT}$.

Next, when the sequence controller 7 is enabled, the sequence controller 7 outputs an enable signal E for a time T2 when the transmission request signal $\overline{RTS}$ is received from the controller 2 and then follows to output an enable signal F for a time T3. The time T2 is set to a time range in which no acknowledge signal is received from a node when the terminal starts the transmission. The time T3 is set to a time range in which the acknowledge signal is received.

After the transmission message TXD is transmitted from the controller 2, the collision detection part 8 detects a collision and outputs the collision signal H when the reception detection signal G ($\overline{CRS}$) is received from the encoder/decoder 1 within the time T2. On the other hand, the collision detection part 8 discriminates that the received signal is the acknowledge signal and does not output the collision detection signal H when the reception detection signal G ($\overline{CRS}$) is received from the encoder/decoder 1 within the time T3. However, when the reception detection signal G ($\overline{CRS}$) is not received even after the time T3, the collision detection part 8 discriminates that the call is unsuccessful and outputs the collision signal H.

Figure 5:
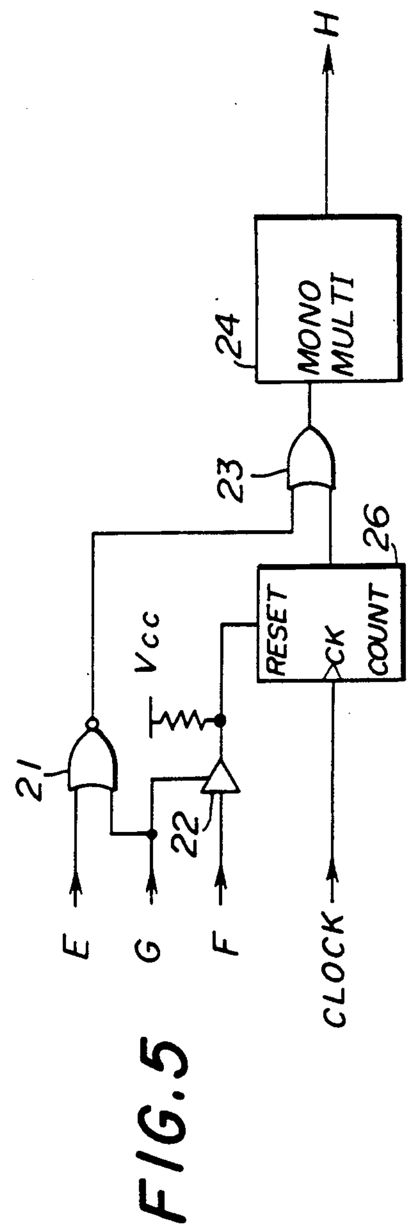
FIG. 5 is a circuit diagram showing an embodiment of a collision detection part shown in FIG. 3.

FIG. 5 shows an embodiment of the collision detection part 8. In FIG. 5, a NOR gate 21 receives the enable signal E and the reception detection signal G and supplies an output signal to a monostable multivibrator 24 via an OR gate 23. The monostable multivibrator 24 outputs the collision signal H. A tristate buffer 22 supplies an output signal "0" to a reset terminal of a counter 26 when the enable signal F is "0" and the reception detection signal G is "1". In this case, the counter 26 outputs a signal "0" and starts to count. When the counted value in the counter 26 reaches a predetermined value, the counter 26 supplies a signal "1" to the monostable multivibrator 24. The monostable multivibrator 24 is triggered by the output signal "1" of the counter 26 and outputs the collision signal H. When the acknowledge signal is received and the reception detection signal G is inverted to "0", the tristate buffer 22 changes to an open-circuit state and a voltage Vcc is supplied to the reset terminal of the counter 26 to reset the counter 26. Accordingly, the monostable multivibrator 24 no longer outputs the collision signal H. The time width of the collision signal H can be set to an arbitrary value by varying a time constant of the monostable multivibrator 24.

Figure 6:
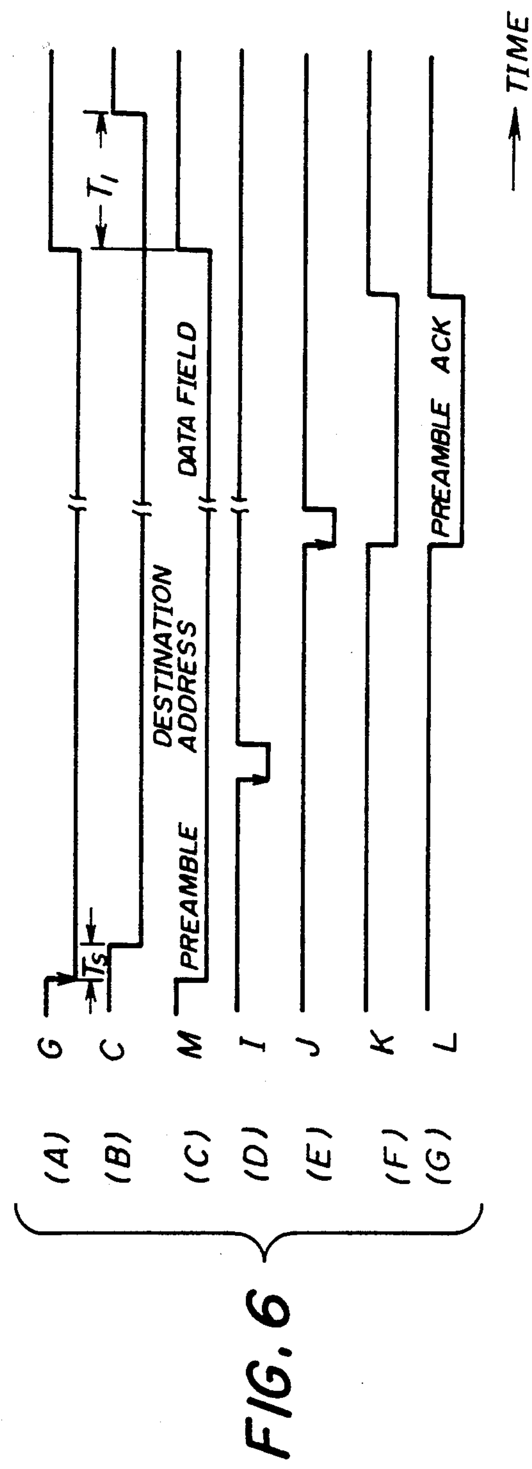
FIGS. 6(A) through 6(G) are timing charts for explaining an operation of the first embodiment when making a normal reception.

Next, a description will be given of the operation of the first embodiment. FIGS. 6(A) through 6(G) are time charts for explaining the operation when making a normal reception, that is, the operation of the acknowledge signal transmitting part 30. FIG. 6(B) shows the enable signal C.

When the encoder/decoder 1 receives the reception messages RCV and $\overline{RCV}$ from the transmitter/receiver 900, the encoder/decoder 1 supplies the reception detection signal G ($\overline{CRS}$) shown in FIG. 6(A), the reception message M (RXD) shown in FIG. 6(C) and the clock signal RXC to the acknowledge signal transmitting part 30. The preamble detection part 3 detects the preamble of the reception message M and outputs the signal I shown in FIG. 6(D). The address comparator part 4 receives the signal I and compares the destination address of the reception message M and the home address stored in the ROM 5. The preamble detection part 3 outputs the signal J shown in FIG. 6(E) when the two addresses coincide. The acknowledge signal generation part 6 receives the signal J and supplies the acknowledge signal L (TXD) shown in FIG. 6(G) and the transmission request signal K ($\overline{RTS}$) to the encoder/decoder 1. The encoder/decoder 1 outputs the acknowledge signals (TRMT, $\overline{TRMT}$), and the operation of the acknowledge signal transmitting part 30 ends. Next, the data field of the transmission message is received and the reception operation ends. The reception detection signal G becomes "1" (OFF) and the enable signal C becomes "1" (ON) after the time T1.

Figure 7:
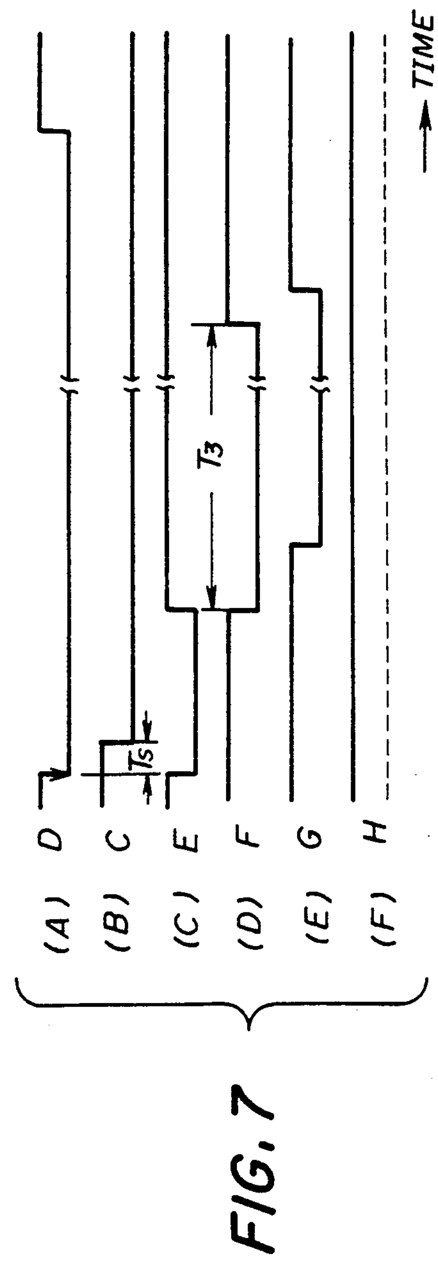
FIGS. 7(A) through 7(F) are timing charts for explaining an operation of the first embodiment when making a normal transmission.

FIGS. 7(A) through 7(F) are time charts for explaining the operation when making a normal transmission. The controller 2 outputs the transmission request signal D ($\overline{RTS}$) shown in FIG. 7(A) and the transmission message TXD which is synchronized to the clock signal TXC. The timer part 20 outputs the enable signal C shown in FIG. 7(B) which is "0". The sequence controller 7 outputs the enable signal E shown in FIG. 7(C) for the time T2 and the enable signal F shown in FIG. 7(D) for the time T3. The encoder/decoder 1 outputs the reception detection signal G ($\overline{CRS}$) shown in FIG. 7(E) during the time T3. When the transmission ends, the transmission request signal D becomes "1" (OFF). The collision signal H remains to be "1" as shown in FIG. 7(F).

FIGS. 8(A) through 8(E) and FIGS. 9(A) through 9(D) respectively are timing charts for explaining an operation of the first embodiment when a transmission is unsuccessful.

Figure 8:
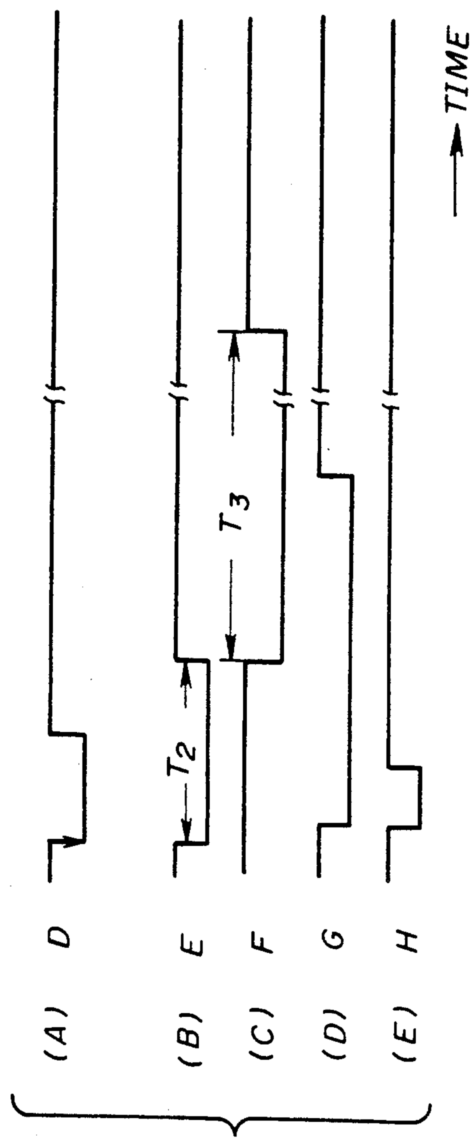
FIGS. 8(A) through 8(E) and FIGS. 9(A) through 9(D) respectively are timing charts for explaining an operation of the first embodiment when a transmission is unsuccessful.
Figure 9:
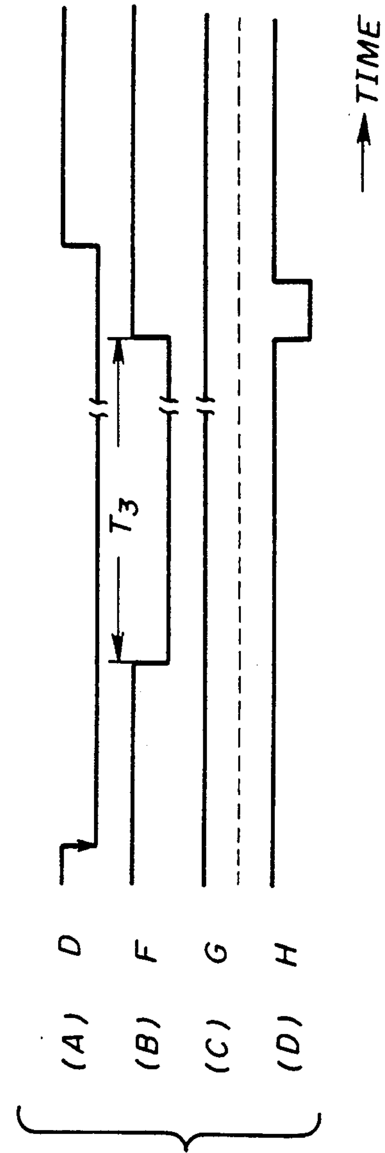

FIGS. 8(A) through 8(E) are timing charts for explaining a collision during the transmission. In this case, the enable signals E and F shown in FIGS. 8(B) and 8(C) are output from the sequence controller 7 when the transmission request signal D shown in FIG. 8(A) is output from the controller 2. The collision detection part 8 receives the reception detection signal G shown in FIG. 8(D) is received while the enable signal E is received, and the collision detection part 8 outputs the collision signal H shown in FIG. 8(E). The controller 2 outputs the transmission request signal D which is "1" (OFF).

FIGS. 9(A) through 9(D) are timing charts for explaining a case where no acknowledge signal is received during the transmission. Responsive to the transmission request signal D shown in FIG. 9(A), the sequence controller 7 outputs the enable signal F shown in FIG. 9(B) and the encoder/decoder 1 outputs the reception detection signal G shown in FIG. 9(C). However, because no reception detection signal G is received by the collision detection part 8, the collision detection part 8 outputs the collision signal H shown in FIG. 9(D). The controller 2 outputs the transmission request signal D which is "1" (OFF).

Next, a description will be given of a second embodiment of the communication control unit according to the present invention. In this embodiment, the guard time is generated similarly to the first embodiment for limiting the transmission and the sending of the acknowledge signal until the state in which no signal exists in the communication path continues for a predetermined time, only in the case of a completion call after the transmission or reception normally ends. In the case of an unsuccessful completion call, the generation of the guard time stops and the next call is waited in a stand-by state so as to improve the efficiency of the communication network.

Figure 10:
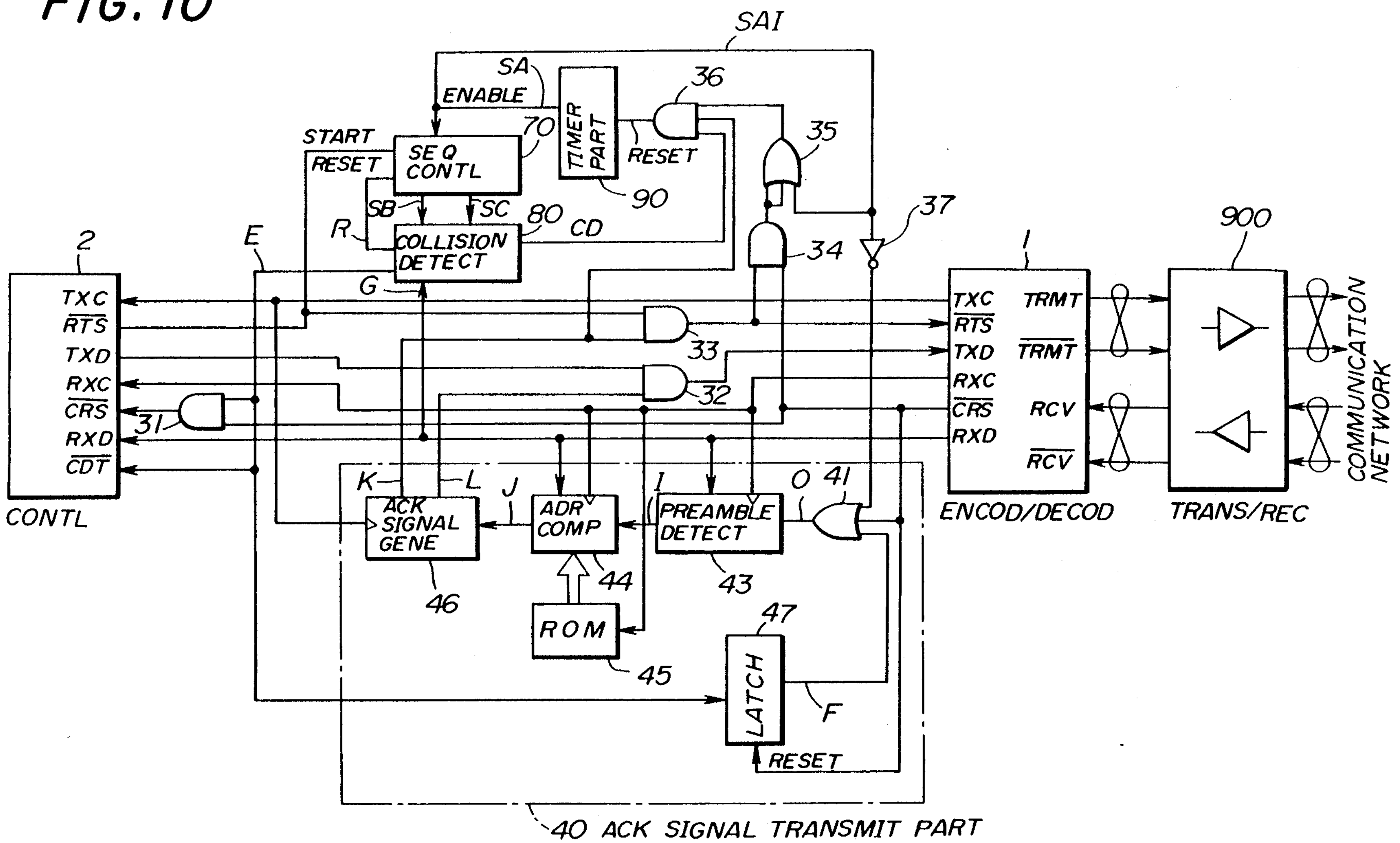
FIG. 10 is a system block diagram showing a second embodiment of the communication control unit according to the present invention together with a part of a terminal.
Figure 11:
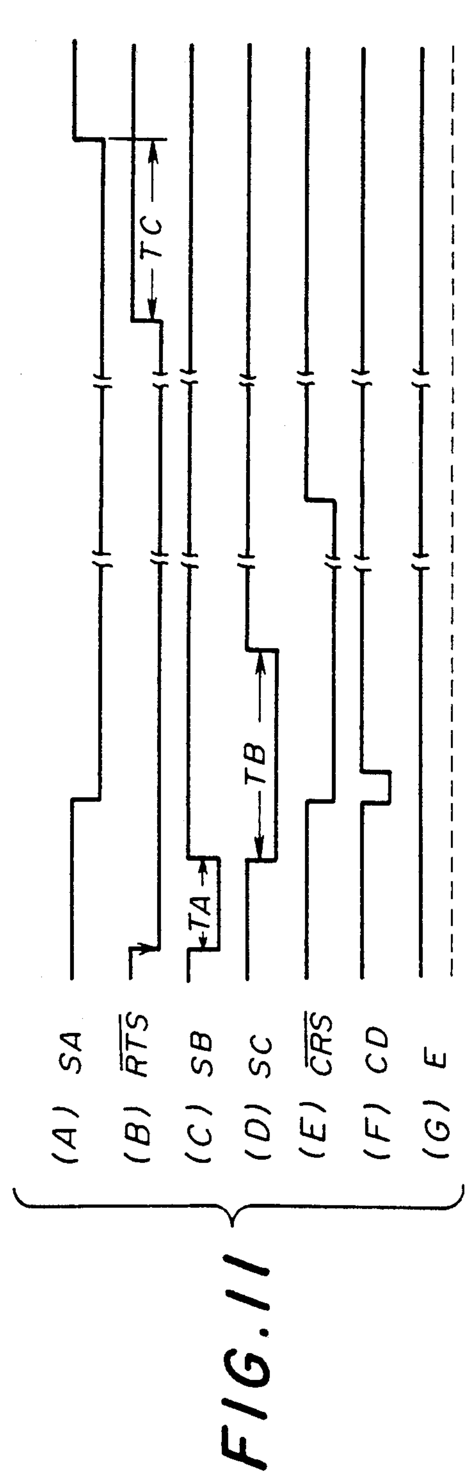
FIGS. 11(A) through 11(G) are timing charts for explaining a transmission operation of the second embodiment.

FIG. 10 shows the second embodiment of the communication control unit according to the present invention. In FIG. 10, those parts which are essentially the same as those corresponding parts in FIG. 3 are designated by the same reference numerals, and a description thereof will be omitted. In FIG. 10, gates 34 through 37 and 41 and a latch circuit 47 are added to the block system shown in FIG. 3 so as to generate the guard time in a timer part 90 only in the case of the completion call.

The transmission operation of the second embodiment will be described in conjunction with the timing charts of FIGS. 11(A) through 11(G). In the stand-by state, the timer part 90 is in a time-out state, that is, in a state such that no generation of the guard time takes place. In this state, the timer part 90 supplies an enable signal SA shown in FIG. 11(A) to a sequence controller 70. At the time of the transmission, the controller 2 supplies a transmission request signal $\overline{RTS}$ shown in FIG. 11(B) to the sequence controller 70 to start the sequence controller 70. During a first predetermined time TA, the sequence controller 70 supplies an enable signal SB shown in FIG. 11(C) to a collision detection part 80. During a time in which the enable signal SB exists, the collision detection part 80 supervises a reception detection message RXD (G) which is output from the encoder/decoder 1. When the reception message RXD is received, the collision detection part 80 outputs a collision detection signal E shown in FIG. 11(G) and a reset signal R, and the sequence controller 70 is reset by the reset signal R. After the first predetermined time Ta ends, the sequence controller 70 supplies an enable signal SC shown in FIG. 11(D) to the collision detection part 80 during a second predetermined time TB. When the collision detection part 80 detects the reception message RXD during the second predetermined time TB, the reception message RXD is detected as the acknowledge signal and the collision detection part 80 supplies an acknowledge detection signal CD shown in FIG. 11(F) which is "0" to the timer part 90 via the gate 36. The timer part 90 is reset by the output signal of the gate 36 and the output enable signal SA falls to the low level ("0"), thereby disabling the sequence controller 70.

After the signal CD is activated, the transmission request signal $\overline{RTS}$ output from the controller 2 and the reception detection signal $\overline{CRS}$ output from the encoder/decoder 1 are passed through the gates 34, 35 and 36, and the output signal of the gate 36 is supplied to the timer part 90 as a reset signal. This reset signal maintains the timer part 90 in the reset state during the transmission and reception. After the communication ends and the signals $\overline{RTS}$ and $\overline{CRS}$ become "1" (OFF), the timer part 90 is released from the reset state and is enabled after a predetermined guard time TC. The sequence controller 70 is enabled following the enablement of the timer part 90. In other words, the transmission is stopped during the guard time TC.

Figure 12:
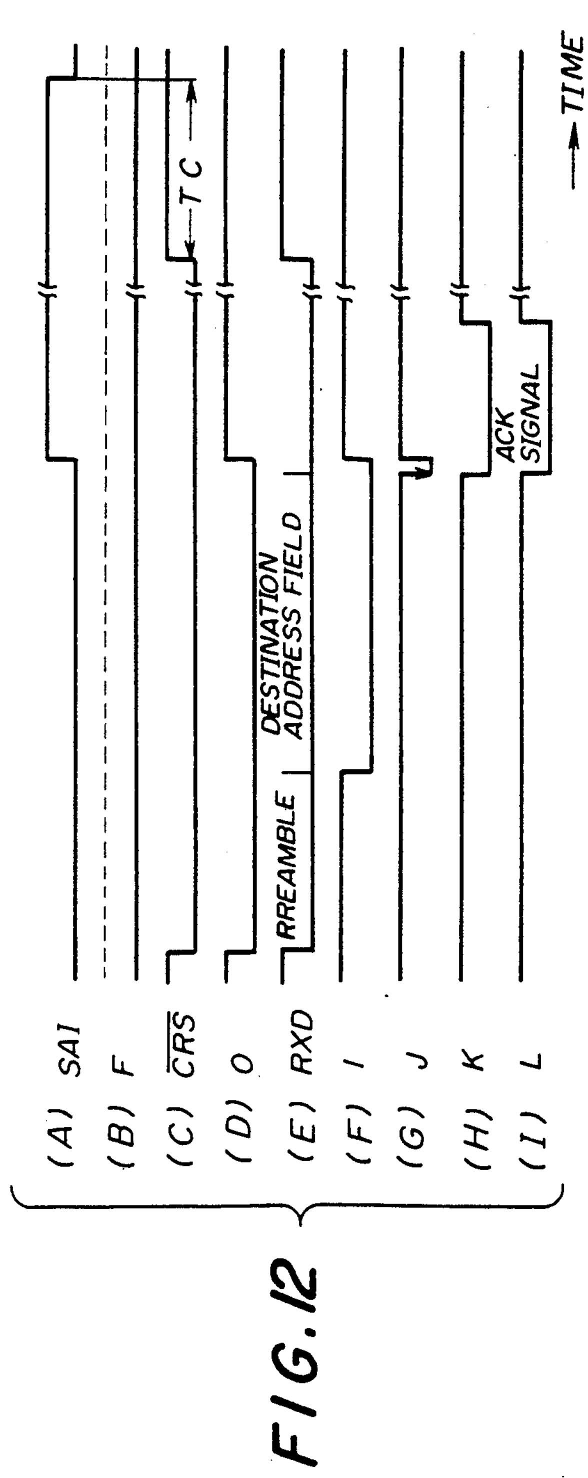
FIGS. 12(A) through 12(I) are timing charts for explaining a reception operation of the second embodiment.

The reception operation of the second embodiment will be described in conjunction with the timing charts of FIGS. 12(A) through 12(I). At the time of the reception, the gate 41 of the acknowledge signal transmitting part 40 receives an output signal SAI of the inverter 37 shown in FIG. 12(A), an output signal F of a latch circuit 47 shown in FIG. 12(B) and a reception detection signal $\overline{CRS}$ shown in FIG. 12(C) which is inverted to the low level ("0") and is output from the encoder/decoder 1. The gate 41 outputs an enable signal 0 shown in FIG. 12(D) which has the low level ("0") to a preamble detection part 43. The preamble detection part 43 enters the preamble of a reception message RXD shown in FIG. 12(E) which is received from the encoder/decoder 1 and supplies an enable signal I shown in FIG. 12(F) to a comparator part 44 when the end of the preamble is detected. The comparator part 44 enters the destination address of the reception message RXD following the preamble, and compares the content of the destination address with the home address which is stored in a ROM 45. When the two addresses coincide, the comparator part 44 supplies an enable signal J shown in FIG. 12(G) to an acknowledge signal generation part 46. The acknowledge signal generation part 46 outputs a transmission request signal K shown in FIG. 12(H) and an acknowledge signal L shown in FIG. 12(I). The transmission request signal K is supplied to the encoder/decoder 1 via the gate 33 as a transmission request signal $\overline{RTS}$. The transmission request signal K is also supplied to the timer part 90 via the gate 36 as a reset signal and resets the timer part 90. The output enable signal SA of the timer part 90 has a low level ("0"), but this low-level enable signal SA is inverted into the signal SA1 by the inverter 37. The signal SA1 has a high level and is supplied to the gate 41. Hence, the output signal 0 of the gate 41 is fixed to the high level ("1") and the preamble detection part 43 and the address comparator part 44 are reset.

When the reception ends, the reception detection signal $\overline{CRS}$ is inverted to the high level, and the output signal level of the gate 36 becomes high. Hence, the timer part 90 is released from the reset state. In addition, the timer part 90 outputs a high-level enable signal SA after the guard time TC, and the acknowledge signal transmitting part 40 is then also released from the reset state, and the next call is waited in the stand-by state.

Figure 13:
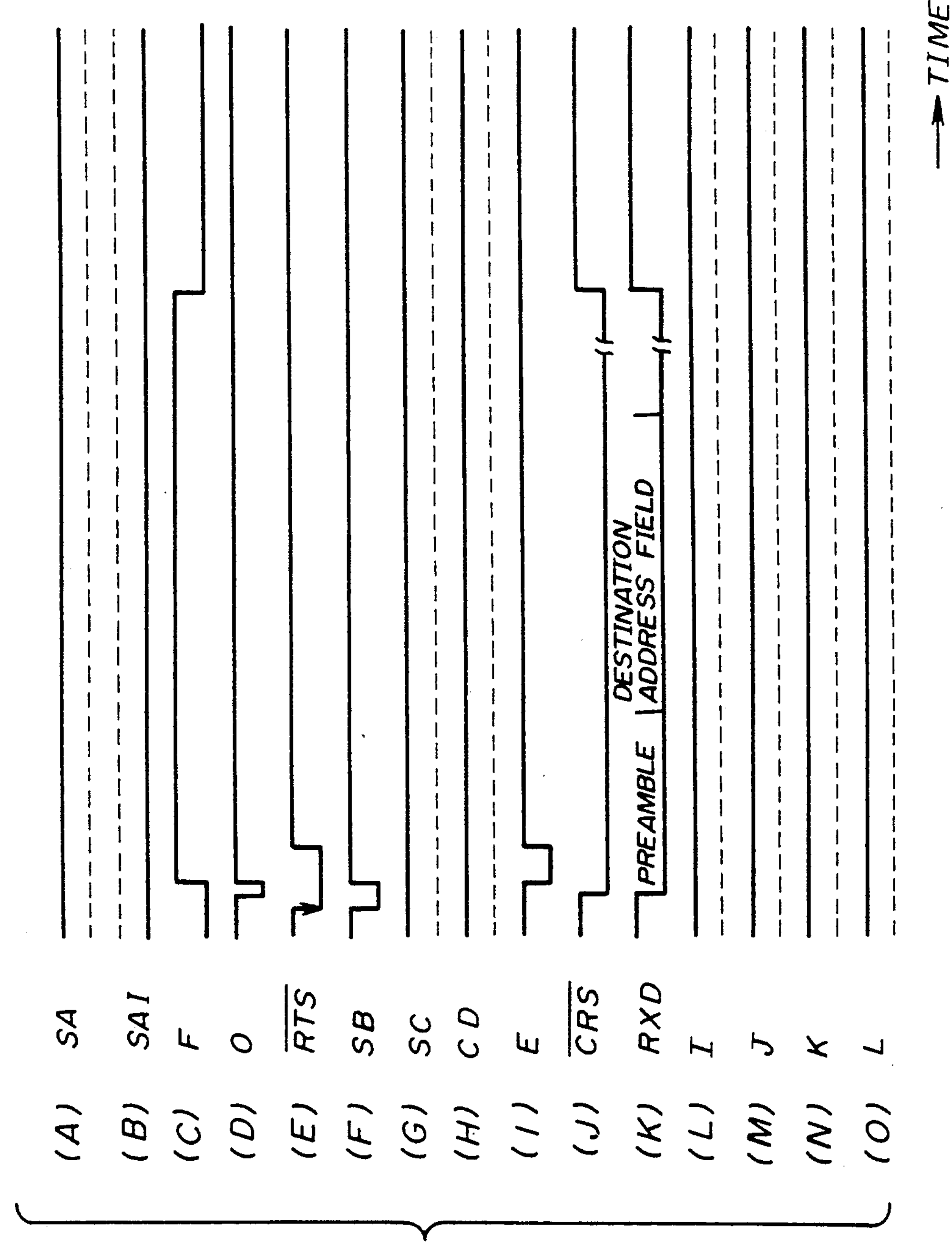

Next, a description will be given of a case where a collision occurs during the transmission or reception, by referring to the timing charts of FIGS. 13(A) through 13(0). When the terminal makes a call, the controller 2 outputs a transmission request signal $\overline{RTS}$ shown in FIG. 13(E) and a transmission message TXD. The sequence controller 70 starts to operate in response to the transmission request signal $\overline{RTS}$ and supplies an enable signal SB shown in FIG. 13(F) to the collision detection part 80. On the other hand, a reception is made at the transmitter/receiver and the encoder/decoder 1 outputs a reception detection signal $\overline{CRS}$ shown in FIG. 13(J) and a reception message RXD shown in FIG. 13(K). The collision detection part 80 which receives the enable signal SB detects a collision when a signal G shown in FIG. 13(D) is received and resets the sequence controller 70 by supplying a reset signal R to the sequence controller 70. In addition, the collision detection part 80 supplies a collision detection signal E shown in FIG. 13(I) to the controller 2 via the gate 31 and stops the transmission request signal $\overline{RTS}$ from the terminal. The collision detection signal E is also supplied to the latch circuit 47 which is released to the reset state by a reception detection signal $\overline{CRS}$ which is received from the encoder/decoder 1. The latch circuit 47 latches the collision detection signal E and supplies a high-level output signal F to the gate 41. The gate 41 outputs an enable signal 0 shown in FIG. 13(D), and the preamble detection part 43 outputs an enable signal I shown in FIG. 13(L). The address comparator part 44 outputs a signal J shown in FIG. 13(M). Hence, the acknowledge signal generation part 46 stops operating and no transmission request signal K is output as shown in FIG. 13(N). Further, the acknowledge signal generation part 46 generates no acknowledge signal L as shown in FIG. 13(0). This means that the state of the timer part 90 remains unchanged and no guard time is generated. The timer part 90 also does not operate when the received acknowledge signal is not intended therefor and no guard time is generated.

FIGS. 13(A), 13(B), 13(C), 13(G) and 13(H) respectively show signals SA, SAI, F, SC and CD.

Figure 14:
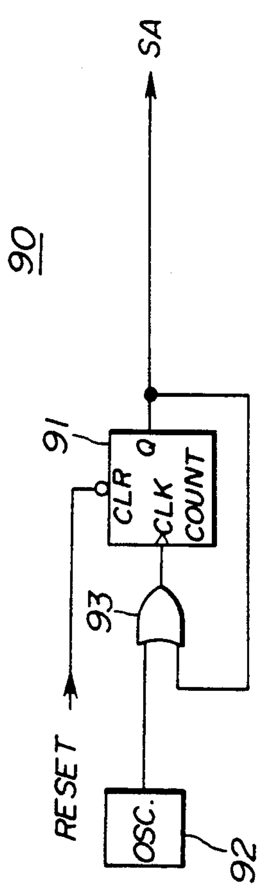
FIG. 14 is a circuit diagram showing a an embodiment of a timer part shown in FIG. 10.

FIG. 14 shows an embodiment of the timer part 90 shown in FIG. 10. The counter 91 is cleared when the level of the reset signal which is received from the gate 36 shown in FIG. 10 becomes low and outputs a low-level Q-output signal. On the other hand, when the level of the reset signal becomes high, the counter 91 counts transitions of a clock signal which is generated from an oscillator 92 and applied to a clock terminal of the counter 91 via a gate 93. When a counted value in the counter 91 reaches a predetermined value, that is, when the guard time TC elapses, the Q-output is inverted to the high level. The Q-output is fed back to the counter 91 via the gate 93 and the counting operation of the counter 91 stops when the level of the Q-output is high. In other words, the time-out state of the timer part 90 occurs when the high-level Q-output is obtained from the counter 91.

Next, a description will be given of a third embodiment of the communication control unit according to the present invention. According to this embodiment, the source side sends a broadcast signal and the destination side does not return an acknowledge signal when making a broadcast communication. In this case, the source side does not supply a collision signal to the terminal and continues the transmission. The block system of this embodiment is basically the same as that shown in FIG. 3 except that the sequence controller 7 and the collision detection part 8 are replaced by a collision detection circuit 500 shown in FIG. 15A and a broadcast identification circuit 600 shown in FIG. 15B and a collision detection signal blocking circuit 700 are additionally provided. The illustration of the entire block system of this third embodiment will therefore be omitted.

Figure 15A:
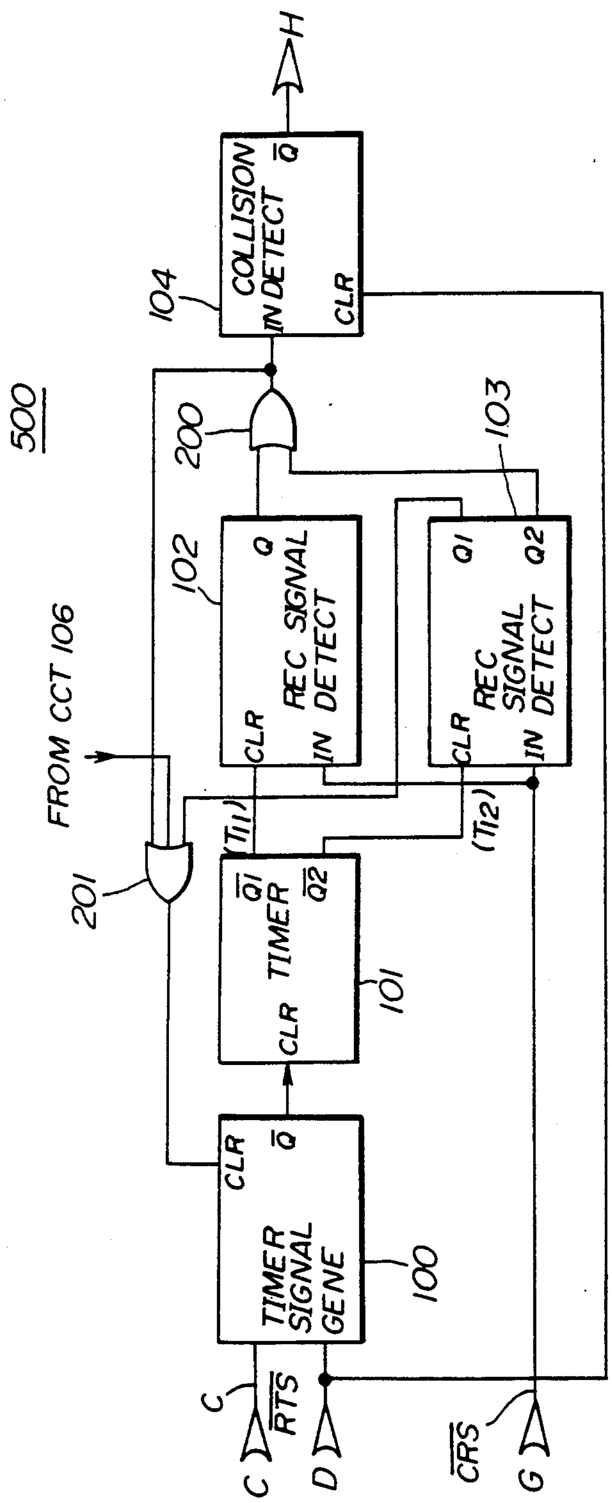
FIGS. 15A, 15B and 15C respectively show embodiments of a collision detection circuit, a broadcast signal identification circuit and a collision detection signal blocking circuit of a third embodiment cf the communication control unit according to the present invention.

The collision detection circuit 500 shown in FIG. 15A generally comprises a timer control signal generating circuit 100, a timer circuit 101, reception signal detection circuits 102 and 103, and a collision detection circuit 104 which are connected as shown. The timer control signal generating circuit 100 receives the output signal C of the timer part 20 shown in FIG. 3 and the transmission request signal $\overline{RTS}$ (D) output from the controller 2. When the level of the transmission request signal $\overline{RTS}$ becomes low and the transmission starts, the timer signal generating circuit 100 supplies a $\overline{Q}$-output to the timer circuit 101. On the other hand, the collision detection circuit 104 is enabled responsive to a falling edge of the transmission request signal $\overline{RTS}$. When the timer circuit 101 is started responsive to the $\overline{Q}$-output of the timer signal generating circuit 100, the timer circuit 101 supplies an enable signal to a clear terminal CLR of the reception signal detection circuit 102 from a terminal $\overline{Q1}$ during a first predetermined time T11 and next supplies an enable signal to a clear terminal CLR of the reception signal detection circuit 103 from a terminal $\overline{Q2}$ during a second predetermined time T12. The reception signal detection circuits 102 and 103 respectively have an input terminal IN for receiving the reception detection signal $\overline{CRS}$ and supervise an input timing of the acknowledge signal.

When the reception detection signal $\overline{CRS}$ is received within the first predetermined time T11, there is a collision and the reception signal detection circuit 102 outputs a signal from a terminal Q. When no acknowledge signal is returned even after a time (T11+T12) elapses, it is detected that there is a collision and a signal is supplied to a gate 200 from a terminal Q2 of the reception signal detection circuit 103. The signal from the terminal Q of the reception signal detection circuit 102 or the terminal Q2 of the reception signal detection circuit 103 is passed through the gate 200 and is supplied to a terminal IN of the collision detection circuit 104 and a gate 201. The collision detection circuit 104 outputs a collision detection signal H, and an output signal of the gate 201 is supplied to a clear terminal CLR of the timer signal generating circuit 100. Hence, the timer signal generating circuit 100 is reset and the operation of the collision detection circuit 500 ends. On the other hand, when a reception detection signal $\overline{CRS}$ is received within the second predetermined time T12, that is, when the acknowledge signal is normally received, a signal from a terminal Q1 of the reception signal detection circuit 103 is supplied to the gate 201 and the timer signal generating circuit 100 is reset by the output signal of the gate 201.

Figure 15B:
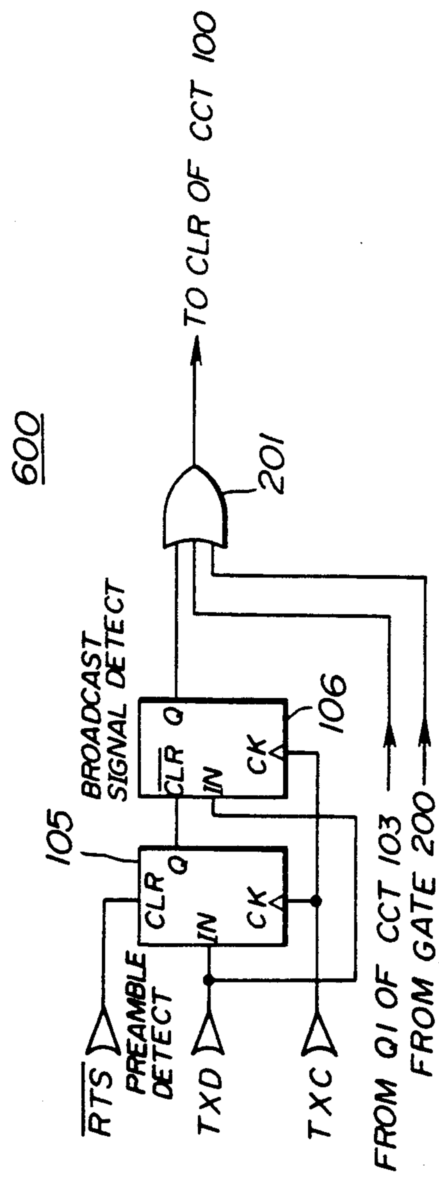

The broadcast identification circuit 600 shown in FIG. 15B generally comprises a preamble detection circuit 105 and a broadcast signal identification circuit 106. The preamble detection circuit 105 receives a transmission request signal $\overline{RTS}$ and a transmission message TXD from the controller 2 shown in FIG. 3 and a clock signal TXC from the encoder/decoder 1. The preamble detection circuit 105 detects a leading preamble and supplies an enable signal from a terminal Q to a terminal $\overline{CLR}$ of the broadcast signal detection circuit 106 at the end of the preamble. The broadcast signal detection circuit 106 reads the destination address which follows the preamble of the transmission message TXD in synchronism with the clock signal TXC, and supplies a signal from a terminal Q to the gate 201 when a broadcast signal is detected. An output signal of the gate 201 is supplied to a clear terminal CLR of the timer signal generating circuit 100 shown in FIG. 15A. Hence, the reception signal detection circuit 103 is cleared (reset) to stop the output of the collision detection signal H.

Figure 15C:
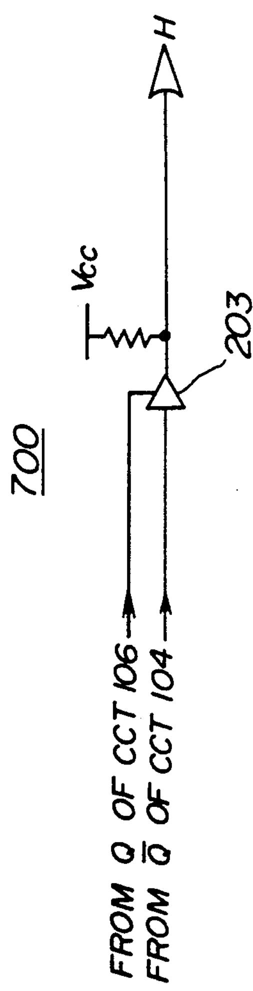

FIG. 15C shows the collision detection signal blocking circuit 700. The collision detection signal blocking circuit 700 comprises a gate 203 which receives the signal from the terminal $\overline{Q}$ of the broadcast signal detection circuit 106 shown in FIG. 15B and the signal from the terminal Q of the collision detection circuit 104 shown in FIG. 15A. The gate 203 blocks the output of the collision detection signal H when the signal is received from the terminal Q of the broadcast signal detection circuit 106.

Figure 16:
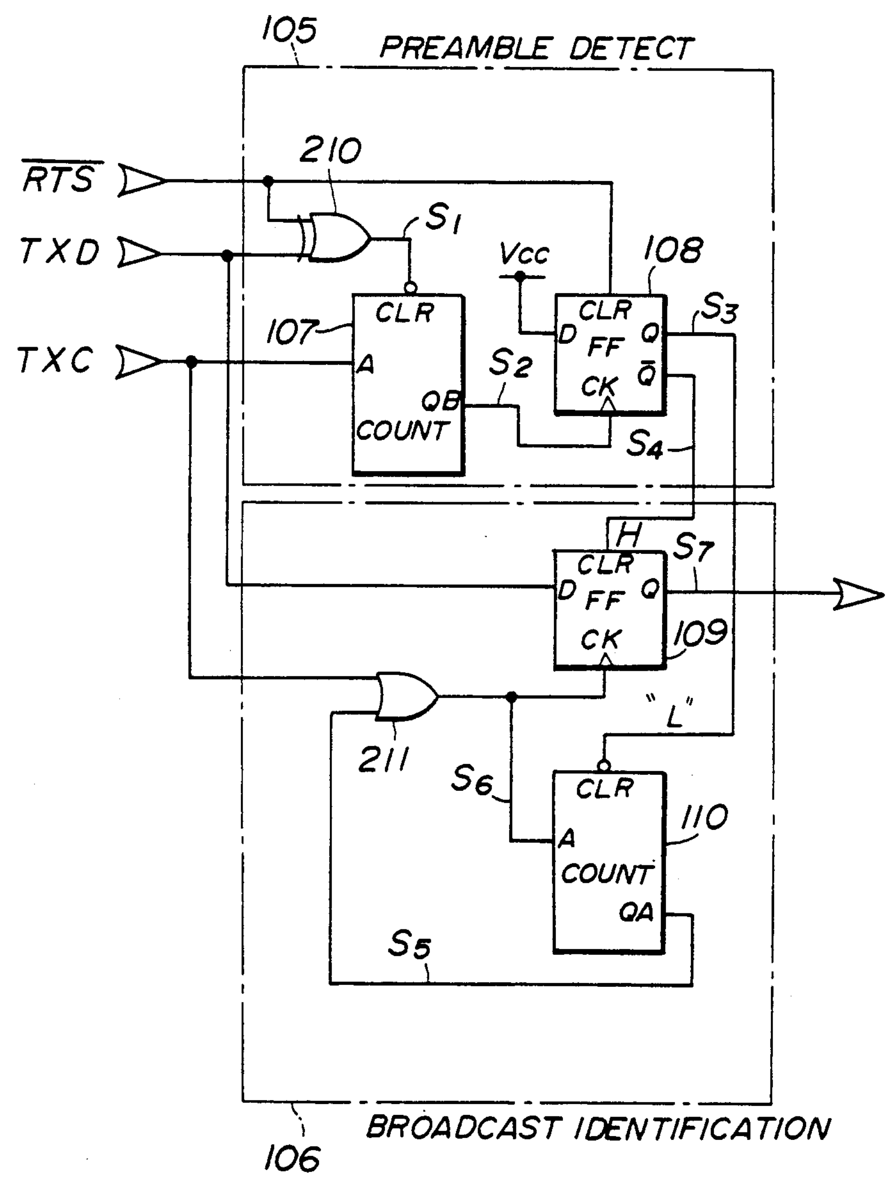
FIG. 16 is a circuit diagram showing embodiments of a preamble detection circuit and a broadcast signal identification circuit of the third embodiment.

FIG. 16 show internal constructions of the preamble detection circuit 105 and the broadcast signal identification circuit 106 shown in FIG. 15B. FIGS. 17(A) through 17(J) are timing charts for explaining a broadcast communication, and FIGS. 18(A) through 18(J) are timing charts for explaining a general communication.

In the case of the Ethernet network, the first bit of the data in the destination address which follows the preamble indicates the broadcast communication when the value is "1" and indicates the discrete communication when the value is "0". In the circuit shown in FIG. 16, an output signal S7 has a high level to indicate the broadcast communication and has a low level to indicate the discrete communication.

Figure 17:
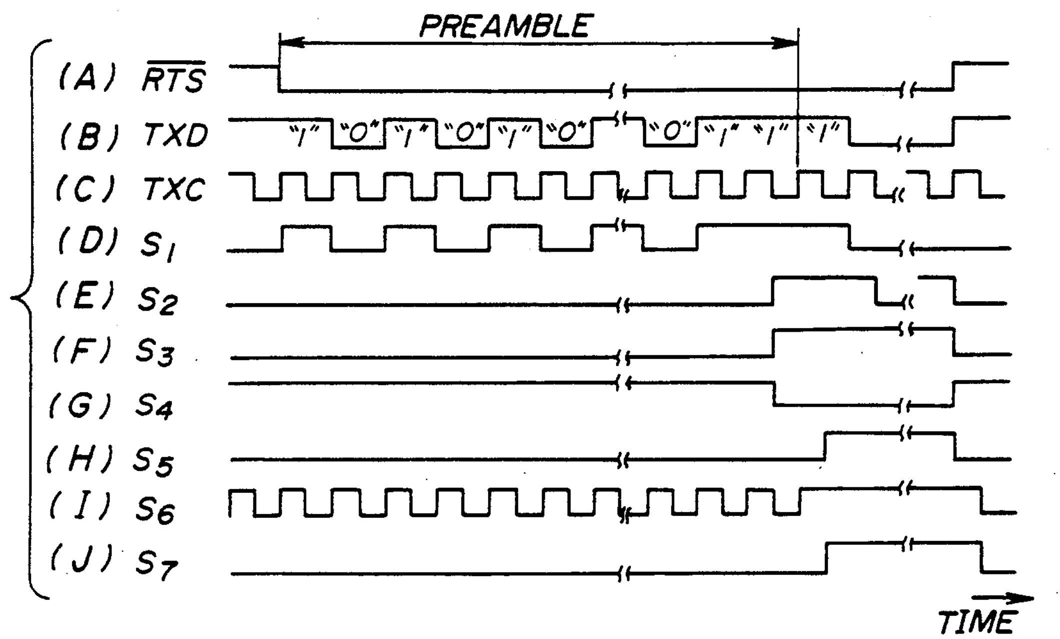
FIGS. 17(A) through 17(J) are timing charts for explaining a broadcast transmission operation of the third embodiment.
Figure 18:
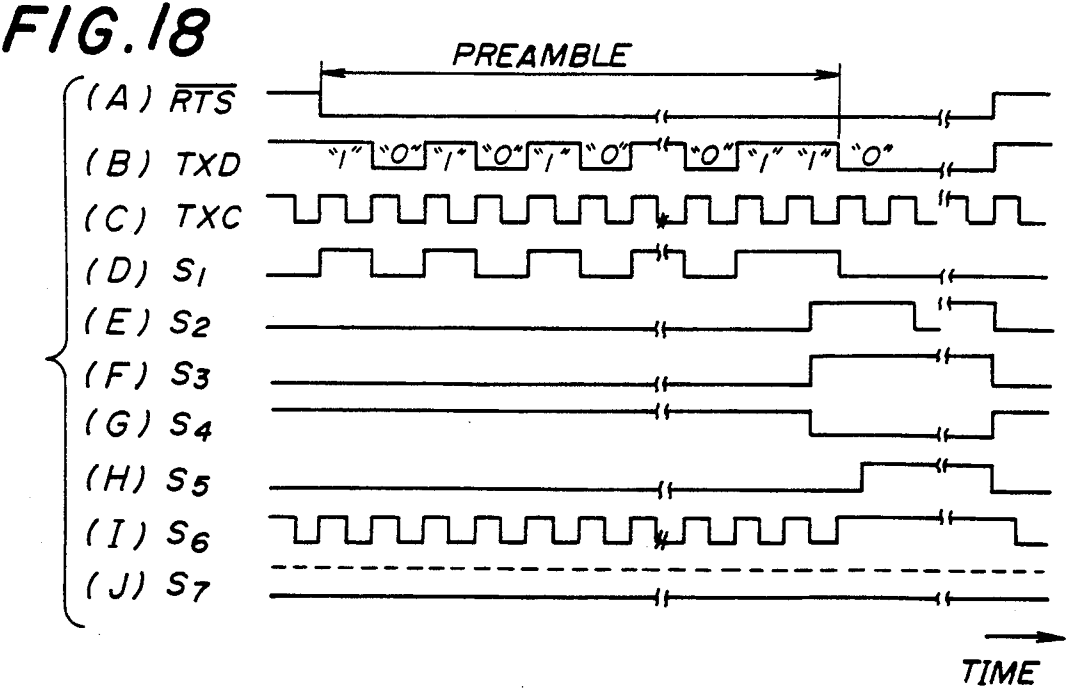
FIGS. 18(A) through 18(J) are timing charts for explaining a discrete transmission operation of the third embodiment.

The preamble detection circuit 105 generally comprises a counter 107 and a D-type flip-flop 108. The counter 107 is cleared by a low-level signal which is applied to a clear terminal CLR, while the flip-flop 108 is cleared by a high-level signal which is applied to a clear terminal CLR. The transmission request signal $\overline{RTS}$ shown in FIG. 17(A) or 18(A) and the transmission message TXD shown in FIG. 17(B) or 18(B) are supplied to an exclusive-OR circuit 210 and an output signal S1 shown in FIG. 17(D) or 18(D) of the exclusive-OR circuit 210 is supplied to the clear terminal CLR of the counter 107. The sequence of data "1", "0", "1", "0", . . . is repeated several times at the beginning of the transmission message TXD and the preamble ends when the data "1" continues for 2 bits. The clock signal TXC shown in FIG. 17(C) or 18(C) is applied to a terminal A of the counter 107. Hence, the counter 107 is reset responsive to a falling edge of the signal S1 and a signal S2 shown in FIG. 17(E) or 18(E) output from a terminal $Q_B$ does not change. The signal S2 output from the terminal $Q_B$ corresponds to a second least significant digit of the binary output. However, when the data "1" continues for 2 bits at the end of the preamble, the counter 107 can count two pulses of the clock signal TXC and the signal S2 output from the terminal $Q_B$ rises from the low level to the high level. The signal S2 is supplied to a clock terminal CK of the flip-flop 108 which receives a fixed high-level signal (Vcc) at a terminal D. The flip-flop 108 is enabled when low-level signal (transmission request signal $\overline{RTS}$) is received at the clear terminal CLR. When the signal S2 received at the clock terminal CK changes to the high level, a signal S3 shown in FIG. 17(F) or 18(F) output from a terminal Q of the flip-flop 108 is inverted to a high level and a signal S4 shown in FIG. 17(G) or 18(G) output from a terminal $\overline{Q}$ of the flip-flop 108 is inverted to a low level.

The broadcast signal detection circuit 106 generally comprises a D-type flip-flop 109 and a counter 110. The signal S3 is applied to a clear terminal CLR of the counter 110 and the signal S4 is applied to a clear terminal CLR of the flip-flop 109. When the preamble ends, the flip-flop 109 and the counter 110 are enabled. The flip-flop 109 inputs from a terminal D the first bit (TXD) of the destination address, and inputs from a clock terminal CK a signal S6 shown in FIG. 17(I) or 18(I) which is synchronized to this one bit. This signal S6 is output from an OR circuit 211 which receives the clock signal TXC and a signal S5 shown in FIG. 17(H) or 18(H) which is output from a terminal $Q_A$ of the counter 110. The broadcast communication is indicated by this one bit when the value is "1", and in this case, a signal S7 shown in FIG. 17(J) output from a terminal Q of the flip-flop 109 is inverted to a high level. On the other hand, the discrete communication is indicated by this one bit when the value is "0", and in this case, the signal S7 shown in FIG. 18(J) is maintained at the low level. The signal S7 is supplied to a clear terminal CLR of the counter 110. On the other hand, the gate 201 counts the clock signal TXC corresponding to the one bit described above, and the signal S5 output from the terminal $Q_A$ of the counter 110 is inverted to the high level. When the high-level signal S5 is supplied to the OR circuit 211, the input of the clock signal TXC to the flip-flop 109 and the counter 110 is blocked, thereby fixing the level of the signal S7 which is output from the terminal Q of the flip-flop 109.

When the transmission ends and the level of the transmission request signal $\overline{RTS}$ becomes high, the preamble detection circuit 105 and the broadcast signal identification circuit 106 are cleared and returned to initial states.

Therefore, according to the present invention, the following effects are obtainable.

(1) The efficiency of a retransmission is improved because it is possible to quickly detect whether a transmission is successful or unsuccessful. In the case of a reception, the concept of address is independent of the network since an acknowledge signal is returned by confirming a destination address, and it is possible to design the network structure with a large degree of freedom. In addition, in a communication network in which a communication path between source and destination terminals can be fixed after returning an acknowledge signal in response to a first transmission message, it is possible to make a full duplex communication. In this case, it is possible to apply the present invention to terminals for use in video phones, video conference systems and the like.

(2) When a communication is unsuccessful, a stand-by state is maintained for a next retrial or another communication from a different terminal, thereby enabling an efficient use of the communication network. The stand-by state has no restrictions as for the time sequence of the terminal such as when making the retrial, and the present invention is applicable to various applications in this respect.

(3) The present invention enables a communication of a broadcast signal. This means that the communication control unit according to the present invention may be used in various applications of existing communication systems.

Further, the present invention is not limited to these embodiments, but various variations and modifications may be made without departing from the scope of the present invention.

What is claimed is:

1. A communication control unit for controlling data transmission and reception between a terminal and a communication network which includes a full duplex communication path, a communication being made by transmitting a sending signal which includes a destination address of a destination terminal and transmitting a returning signal when the destination address is confirmed, said communication control unit comprising:

first control means including means for timing a first predetermined period of time from a start of a transmission, means for timing a second predetermined period of time starting when the first predetermined period of time elapses, and means for stopping the transmission when the returning signal is received within the first predetermined period of time and also when no returning signal is received after the second predetermined period of time elapses;

acknowledge signal transmitting means connected to said first control means and including means for detecting the sending signal, means for comparing an address which is included within the detected sending signal with a home address of a terminal to which the communication control unit is connected, and means for transmitting the returning signal when the two compared addresses coincide;

timer means connected to said acknowledge signal transmitting means and said first control means for limiting a start of said first control means and said acknowledge signal transmitting means until a state in which no signal exists in the communication path continues for a third predetermined period of time; and broadcast identification means for identifying a broadcast signal which is included in the destination address of the sending signal, and second control means for enabling the transmission when the broadcast signal is identified by said broadcast identification means even when no returning signal is received after the second predetermined period of time.

2. The communication control unit as claimed in claim 1 which further comprises second control means for starting said timer means when the sending signal which includes the destination address is transmitted and the returning signal is received within the second predetermined period of time and also when a signal is received in a stand-by state and the received signal includes the home address of the terminal to which the communication control unit is connected.

3. The communication control unit as claimed in claim 2 which further comprises collision detection means for outputting a collision detection signal when the sending signal and the received signal are generated substantially at the same time and also when no returning signal is received even after the second predetermined period of time elapses, and third control means for stopping an operation of said acknowledge signal transmitting means responsive to the collision detection signal.

4. The communication control unit as claimed in claim 3 wherein said collision detection means limits the start of said timer means by supplying the collision detection signal &.o said timer means.

5. The communication control unit as claimed in claim 3 wherein said collision detection means constitutes a part of said first and second control means, and said third control means constitutes a part of said first and second control means.

6. The communication control unit as claimed in claim 3 which further comprises broadcast identification means for identifying a broadcast signal which is included in the destination address of the sending signal, and fourth control means for enabling the transmission when the broadcast signal is identified by said broadcast identification means even when no returning signal is received after the second predetermined period of time.

7. The communication control unit as claimed in claim 6 which further comprises fifth control means for blocking an output of the collision detection signal from said collision detection means when the broadcast signal is identified by said broadcast identification means.

8. The communication control unit as claimed in claim 1 which further comprises collision detection means for outputting a collision detection signal when the sending signal and the received signal are generated substantially at the same time and also when no returning signal is received even after the second predetermined period of time elapses, and third control means for stopping an operation of said acknowledge signal transmitting means responsive to the collision detection signal.

9. The communication control unit as claimed in claim 8 which further comprises fourth control means for blocking an output of the collision detection signal from said collision detection means when the multicast signal is identified by said broadcast identification means.

10. The communication control unit as claimed in claim 9 wherein said collision detection means limits the start of said timer means by supplying the collision detection signal to said timer means.

11. The communication control unit as recited in claim 1, wherein said communication control unit is utilized to couple a full duplex communication system LAN, in which a path is fixed responsive to the acknowledge signal, to a CSMA/CD system LAN station.

* * * * *